US011528328B2

(12) United States Patent
Kahn et al.

(10) Patent No.: US 11,528,328 B2
(45) Date of Patent: Dec. 13, 2022

(54) STATELESS NETWORK FUNCTION SUPPORT IN THE CORE NETWORK

(71) Applicant: Nokia Technologies Oy, Espoo (FI)

(72) Inventors: Colin Kahn, Morris Plains, NJ (US); Thomas Theimer, Baierbrunn (DE); Devaki Chandramouli, Plano, TX (US); Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/759,494

(22) PCT Filed: Dec. 15, 2017

(86) PCT No.: PCT/US2017/066622
§ 371 (c)(1),
(2) Date: Apr. 27, 2020

(87) PCT Pub. No.: WO2019/117940
PCT Pub. Date: Jun. 20, 2019

(65) Prior Publication Data
US 2020/0344306 A1    Oct. 29, 2020

(51) Int. Cl.
*H04L 15/16* (2006.01)
*H04L 29/08* (2006.01)
(Continued)

(52) U.S. Cl.
CPC ........ *H04L 67/142* (2013.01); *G06F 9/45558* (2013.01); *H04L 41/0893* (2013.01); *G06F 2009/45595* (2013.01)

(58) Field of Classification Search
CPC ............... H04L 67/142; H04L 41/0893; H04L 41/0806; G06F 9/45558; G06F 2009/45595
(Continued)

(56) References Cited

U.S. PATENT DOCUMENTS 8,775,632 B2 * 7/2014 Lim ................ H04L 67/14
709/227
9,229,784 B2 * 1/2016 DeJana ............ H04L 67/1021
(Continued)

FOREIGN PATENT DOCUMENTS

AU    2003218310 A1 * 12/2003 ............... G06F 9/54
CA    3065624 A1 * 12/2018 ........... H04L 41/042
(Continued)

OTHER PUBLICATIONS

Nokia, Alcatel-Lucent Shanghai Bell, "Response to Interim Agreements for KI 7 proposal in S2-165801." 3rd Generation Partnership Project (3GPP), SA WG2 Meeting #117, S2-165902, Kaohsiung City, Taiwan, Oct. 17-21, 2016. 11 pages.

*Primary Examiner* — David R Lazaro
*Assistant Examiner* — Berhanu Shitayewoldetadik
(74) *Attorney, Agent, or Firm* — Mintz Levin Cohn Ferris Glovsky and Popeo, P.C.

(57) ABSTRACT

Methods and apparatus, including computer program products, are provided for supporting network functions. In some example embodiments, there may be provided a method that includes selecting, by a network node, a network function instance and/or a group of network function instances, the selecting based on information indicating membership of the network function instance in the group of network functions instances and the information including session information for a request associated with a session of a user equipment, the session information indicating whether the network function instance and/or the group of network function instances is assigned to the user equipment; and forwarding, by the network node, the request to the selected network function instance and/or the selected group. Related systems, methods, and articles of manufacture are also described.

20 Claims, 7 Drawing Sheets

(51) Int. Cl.
*H04L 12/24* (2006.01)
*G06F 9/455* (2018.01)
*G06F 15/16* (2006.01)
*H04L 67/142* (2022.01)
*H04L 41/0893* (2022.01)

(58) Field of Classification Search
USPC ........................................................ 709/223
See application file for complete search history.

(56) References Cited

U.S. PATENT DOCUMENTS

| | | | |
|---|---|---|---|
| 9,674,693 B2 | 6/2017 | Kompella et al. | |
| 9,811,370 B2* | 11/2017 | DeJana | G06F 9/45558 |
| 9,952,906 B1* | 4/2018 | Buchheit | H04L 12/4625 |
| 10,469,313 B2* | 11/2019 | Oohira | G06F 9/46 |
| 10,681,072 B2* | 6/2020 | Alfano | H04W 12/12 |
| 10,805,172 B2* | 10/2020 | Dome | H04L 41/0896 |
| 11,398,883 B2* | 7/2022 | Ganesan | H04L 1/1812 |
| 2003/0217158 A1* | 11/2003 | Datta | G06F 9/54 709/228 |
| 2008/0040484 A1* | 2/2008 | Yardley | H04L 67/02 709/227 |
| 2010/0115582 A1* | 5/2010 | Sapp | H04L 41/0806 726/1 |
| 2013/0073716 A1* | 3/2013 | DeJana | H04L 67/1021 709/224 |
| 2014/0019523 A1* | 1/2014 | Heymann | G06F 16/958 709/203 |
| 2014/0280954 A1* | 9/2014 | Yu | H04L 12/1485 709/226 |
| 2015/0033312 A1* | 1/2015 | Seed | H04L 67/142 709/227 |
| 2015/0188983 A1* | 7/2015 | Elias | H04W 12/37 715/744 |
| 2015/0195137 A1* | 7/2015 | Kashyap | H04L 12/1886 370/254 |
| 2016/0055028 A1* | 2/2016 | DeJana | G06F 9/5077 718/1 |
| 2016/0085576 A1* | 3/2016 | Chastain | G06F 9/45537 718/1 |
| 2016/0262038 A1* | 9/2016 | Dunn | H04L 41/0886 |
| 2016/0277509 A1 | 9/2016 | Qiang | |
| 2016/0323245 A1* | 11/2016 | Shieh | H04L 63/20 |
| 2017/0024234 A1* | 1/2017 | Wu | G06F 9/45533 |
| 2017/0063628 A1* | 3/2017 | Rasanen | H04L 41/0803 |
| 2017/0220739 A1* | 8/2017 | Hammerle | G16H 40/67 |
| 2017/0257276 A1* | 9/2017 | Chou | H04L 41/0823 |
| 2017/0272523 A1* | 9/2017 | Cillis | H04L 41/5096 |
| 2017/0295082 A1* | 10/2017 | Wu | H04L 43/14 |
| 2017/0303259 A1* | 10/2017 | Lee | H04W 28/16 |
| 2017/0318570 A1* | 11/2017 | Shaw | H04L 63/0892 |
| 2017/0324612 A1* | 11/2017 | Perez | H04L 41/0893 |
| 2017/0331691 A1* | 11/2017 | Zhou | H04L 69/329 |
| 2017/0332212 A1* | 11/2017 | Gage | H04L 67/1044 |
| 2017/0339609 A1* | 11/2017 | Youn | H04W 76/11 |
| 2018/0034703 A1* | 2/2018 | Anholt | H04L 69/40 |
| 2018/0048551 A1* | 2/2018 | Lee | H04L 43/04 |
| 2018/0060135 A1* | 3/2018 | Lacey | H04L 41/0803 |
| 2018/0083828 A1* | 3/2018 | Cartaya | H04L 41/0893 |
| 2018/0123943 A1* | 5/2018 | Lee | H04L 45/28 |
| 2018/0159745 A1* | 6/2018 | Byers | G06F 9/455 |
| 2018/0302273 A1* | 10/2018 | Dome | H04L 41/0896 |
| 2019/0014112 A1* | 1/2019 | Lacey | G06F 21/44 |
| 2019/0132330 A1* | 5/2019 | Celozzi | G06F 21/53 |
| 2019/0191309 A1* | 6/2019 | Kweon | H04L 9/32 |
| 2020/0084096 A1* | 3/2020 | Lacey | H04L 12/66 |
| 2020/0326989 A1* | 10/2020 | Li | H04L 67/1031 |
| 2022/0224589 A1* | 7/2022 | Das | H04L 9/3213 |
| 2022/0237431 A1* | 7/2022 | George | G06N 20/00 |

FOREIGN PATENT DOCUMENTS

| | | | | |
|---|---|---|---|---|
| CN | 106465160 A | | 2/2017 | |
| EP | 3171542 A1 * | | 5/2017 | ............ H04L 12/14 |
| EP | 3447965 B1 * | | 8/2020 | ......... H04L 41/0806 |
| JP | 2011192307 A * | | 9/2011 | ............ G06F 16/70 |
| JP | 5054202 B2 * | | 10/2012 | ............ H04L 12/14 |
| KR | 20140093720 A * | | 7/2014 | ......... H04L 65/1086 |
| KR | 20170119296 | | 10/2017 | |
| WO | WO-2014005636 A1 * | | 1/2014 | ........... G06F 21/604 |
| WO | WO-2015165513 A1 * | | 11/2015 | ......... H04L 41/0803 |
| WO | WO2016007494 * | | 1/2016 | ............. H04W 4/00 |
| WO | WO-2016050663 A1 | | 4/2016 | |
| WO | WO-2017176877 | | 10/2017 | |
| WO | WO-2018038412 A1 * | | 3/2018 | ............ H04W 88/06 |
| WO | WO-2018065632 A1 * | | 4/2018 | ......... H04L 41/0893 |

* cited by examiner

STATELESS NETWORK FUNCTION SUPPORT IN THE CORE NETWORK

CROSS REFERENCE TO RELATED APPLICATIONS

This application is a national-phase entry of Patent Cooperation Treaty Application No. PCT/US2017/066622 filed Dec. 15, 2017, entitled "STATELESS NETWORK FUNCTION SUPPORT IN THE CORE NETWORK," the contents of which is hereby incorporated by reference in its entirety.

FIELD

The subject matter described herein relates to cellular networks.

BACKGROUND

5th generation mobile networks (5G) will evolve to provide higher data rates with lower latency to more devices, when compared to 4G. Moreover, it is anticipated that 5G will provide support for additional services including device-to-device communications, machine-type communications, broadcast services, emergency communications, and Internet of Things communications. The 5G core network along with the 5G radio access network and user equipment will need to support these services, higher data rates, and lower latency.

SUMMARY

Methods and apparatus, including computer program products, are provided for supporting network functions.

In some example embodiments, there may be provided a method that includes selecting, by a network node, a network function instance and/or a group of network function instances, the selecting based on information indicating membership of the network function instance in the group of network functions instances and the information including session information for a request associated with a session of a user equipment, the session information indicating whether the network function instance and/or the group of network function instances is assigned to the user equipment; and forwarding, by the network node, the request to the selected network function instance and/or the selected group.

In some variations, one or more of the features disclosed herein including the following features can optionally be included in any feasible combination. The network node may receive the request. The membership of the network function instance in the group may be determined based on a group identifier. The network node may receive the information, the information including a group identifier identifying the group and/or a pointer identifying the network function instance, the group identifier and/or the pointer previously being assigned to serve requests for the user equipment. The network node may receive candidate information including at least one candidate network function instance, wherein the candidate information indicates the membership of the network function instance in the group and/or address information of the candidate network function instance. In response to the information indicating the session is assigned to the group identifier and the pointer, the network node may forward the request to the network function instance indicated by the group identifier and the pointer, wherein the network function instance is within the group indicated by the group identifier. In response to the information indicating the session is assigned to the group identifier without the pointer being assigned, the network node may forward the request to the network function instance selected from within the group indicated by the group identifier. In response to the information indicating the session has not been assigned the group or the pointer, a candidate network function instance may be selected, based on the candidate information; the candidate network function instance may be in a corresponding group of network function instances, wherein the candidate network function instance comprises the selected network function instance. As part of session information, the pointer to the selected network function instance and/or the group identifier to the selected group may be stored. The network node may receive a release indication indicating the session is not bound to the network function instance, and release the pointer to the network function instance. The network function instance may be configured to provide at least an access management function, a session management function, a policy control function, a user plane function, a user data management function, an authentication server function, a network exposure function, and/or a network slice selection function. The network function instance may include a virtualized network function instance. The group may include virtualized network function instances. The virtualized network function instance may be virtualized in a host computer and/or a virtual machine.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
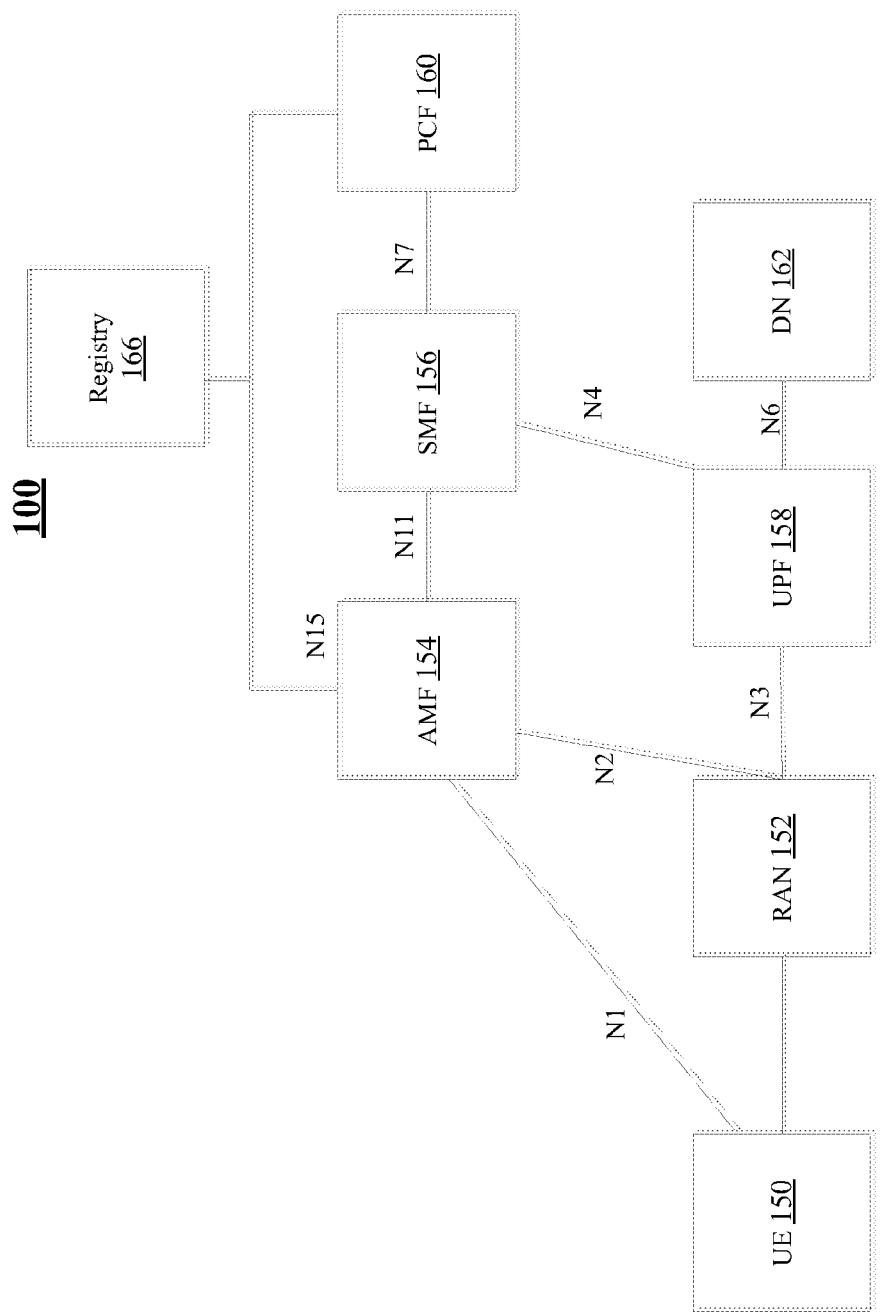
FIG. 1A depicts an example of a portion of a 5G network, in accordance with some example embodiments.

Like labels are used to refer to same or similar items in the drawings.

DETAILED DESCRIPTION

As wireless networks evolve towards 5G and beyond, some network functions may be virtualized. Rather than sending a request to a dedicated, specialized network node that performs a single network function (NF) for example, a host, such as a cloud-based computer server, may service the request using an instance of a NF that has been virtually instantiated. This virtualized network function (VNF) may allow what was once performed on the dedicated, specialized network node to be performed as a service on, for example, on general purpose hosts.

As this VNF framework evolves, there may be different levels of implementation maturity levels which may need to coexist. For example, VNFs may initially be adapted to work on general purpose hardware that provide a virtualized system in which the application logic is separated from the hardware and associated infrastructure layer operations and maintenance (OA&M). And, the user equipment's (UE) session may be assigned to a specific VNF instance. The evolution may also include network functions that support one or more somewhat independent software services. Software service instances, or the VNF instances supporting the service, may be discovered by a consumer and, once discovered, utilized by the consumer for a UE's session. The evolution towards VNFs may also include compute and storage separated in the network infrastructure layer, so the VNFs can utilize available resources as needed. For example, the VNFs may store context information, for assigned UE sessions, in persistent storage, such as a database that is separate from the VNF processing. This separation may enable storage resources to be scaled independently of the host's compute resources being used for VNF processing.

The VNF evolution may also include VNFs that are semi-stateless. For example, a given UE's session context may be retrieved from persistent storage, and for each occurrence of the UE's activity during a given UE session, the session context may be dynamically assigned to different VNF instances. But during a given occurrence of UE activity, all transactions may be directed to a selected VNF instance. When the UE becomes dormant during the session, the corresponding session information (for example, the context of the session) may be returned to persistent storage, which can be accessed by a certain group of VNF instances. When the UE's activity resumes, another, different VNF instance (which is part of the group) may be selected to resume handling, based on the stored session information, of the transactions for the UE's session.

VNFs may be functionally different providing different NFs, such as an access management function (AMF) VNF, a session management function (SMF) VNF, and/or the like. Alternatively or additionally, VNFs may be functionally the same or similar in some respects but have different UE session data for corresponding UEs. For example, a group of VNF instances may all be functionally similar but each VNF instance may be configured with different session data for the UE being served. Each group of VNF instances may also be identified by a group identifier (ID). The group IDs may be assigned by a network management plane and stored at persistent storage, such as a registry an example of which is a network repository function (NRF).

Some VNFs may be stateless. When stateless, the UE's session(s) may be decoupled from VNFs, so the UE may be dynamically assigned to a given VNF instance only for the duration of a single transaction (which may be on the order of milliseconds, for example). After the transaction is complete, the UE's session information may be returned to a persistent storage, which can be accessed by a certain group of VNF instances. When a subsequent transaction arrives for a UE, a new (for example, another and/or different) VNF instance may be selected based on the stored session information, such as the UE's context information. The session information may indicate the UE is authorized to receive service, include encryption keys for protecting user plane data and control plane messages, indicate network functions currently holding state information for the UE, provide network slice information associated with the UE, include tunnel endpoint information (for example, of a RAN), include QoS for which the UE is authorized, include private group membership and serving area restrictions, and/or include other context information. The stateless VNF instances may be considered stateless from the perspective of the UE sessions, but the VNFs may be stateful in other respects such as having node-level state information. At the node level for example, a VNF may have a state, such as whether the VNF instance is in or out of service, in or out of overload, persistent associations with other functions and platforms (for example, for OA&M and analytics).

As used herein, a VNF may be stateless, so that each transaction, even within the same UE session or across different sessions, can be handled by a different VNF having access to the session information stored in persistent storage. For stateless VNFs, a transaction may be sufficiently short (for example, on the order of milliseconds) so that the consuming NF may wait if necessary for an ongoing transaction to complete and/or the UE session information to be returned to persistent storage before the consuming NF selects a new VNF instance for the next transaction. The VNF may, as noted, be semi-stateless in the sense that the UE state may be held for a period of UE activity (which may be seconds to minutes in duration, for example) before the UE session information is returned to persistent storage. The consuming NF may, as such, require a mechanism to determine if there is an assigned VNF instance. If so, the consuming NF can select the assigned VNF instance before attempting to choose a new VNF instance and retrieve context information from persistent storage for the next transaction. In some example embodiments, if a VNF instance has a group ID, the VNF instance corresponds to a VNF instance that is stateless or semi-stateless, so any of the VNF instances in the group (which is identified by the group ID) can serve a transaction for a given UE.

The VNF evolution may, as noted, yield a cloud-based network infrastructure and 3GPP core network functions having different levels of maturity, configurations, and/or the like. For example, the VNFs may be instantiated in data centers at different times, having different configurations (for example, some being stateful, some being semi-stateless, and some being stateless), having different versions, and/or having implementations from different manufactures/vendors. These VNF differences may pose a challenge for the deployment of VNFs including their discovery and selection.

In some example embodiments, there may be provided a system in which stateful, semi-stateless, and stateless VNF instances can be discovered and selected.

FIG. 1A depicts an example of a portion of a 5G wireless network 100, in accordance with some example embodiments. For example, the 5G wireless network 100 may include a user equipment (UE) 150 configured to wirelessly couple to a radio access network (RAN) 152, such as a base station and/or other type of wireless access point. The network 100 may include a core network, which may include an access management function (AMF) 154, a session management function (SMF) 156, a policy control function (PCF) 160, and a user plane function (UPF) 158. The network 100 may also couple to other nodes and networks, such as a data network (DN) 162, a registry 166 such as a network repository function (NRF), and/or other nodes or networks. FIG. 1A also depicts service interfaces, such as N1, N2, N3, N4, N6, N7, N11, N15, and/or the like. The architecture and the service interfaces may be defined in accordance with a standard, such as 3GPP TS 23.501.

The network nodes depicted at FIG. 1A may be implemented as dedicated, specialized network function nodes. However, one or more of the network nodes may be implemented as a virtualized network function (VNF), in accordance with some example embodiments. For a packet data unit session request associated with the UE 150 for example, the AMF 154 may send a request to the SMF 156 which may be implemented as a VNF, in accordance with some example embodiments. For example, a plurality of VNFs may be instantiated at one or more host computers, and some of the VNF instances may be of a type that can provide the SMF network function.

Figure 1B:
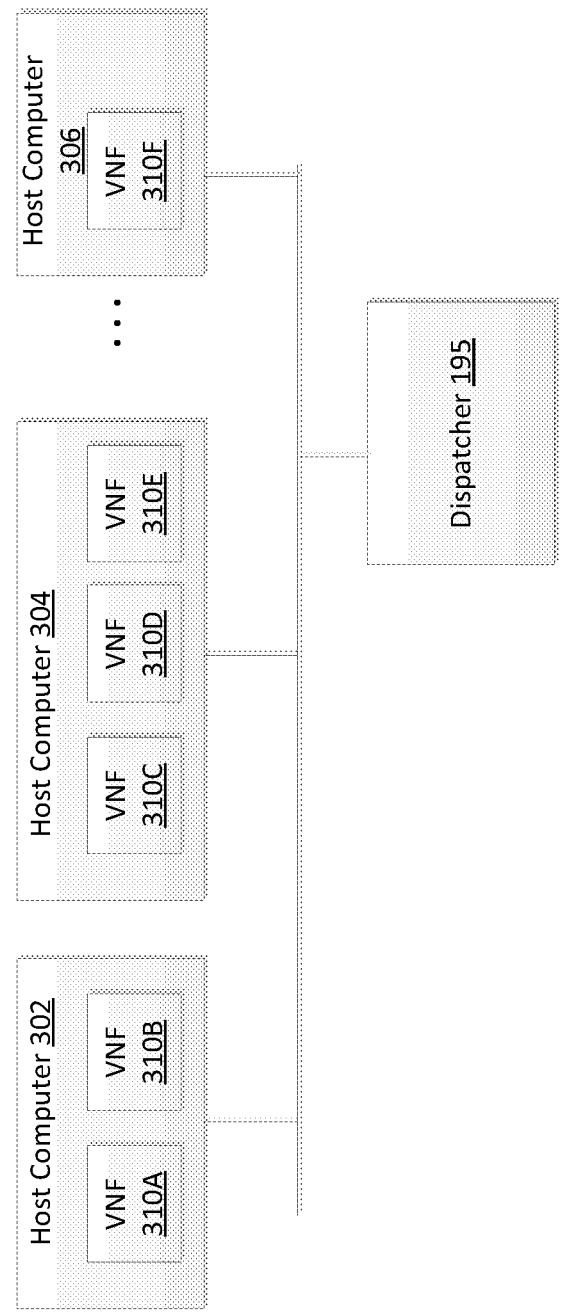
FIG. 1B depicts examples of hosts for providing virtual network functions, in accordance with some example embodiments.

FIG. 1B depicts an example of a system 199 including host computers 302-306 for instantiating VNFs, in accordance with some example embodiments. Although some of the examples refer to the SMF being virtualized as an instance of VNF ("VNF instance"), other network functions, such as the AMF, the PCF, the UPF, and/or other types of network functions and/or services, may be virtualized, in accordance with some example embodiments. Moreover, although some of the examples herein refer to a one-to-one mapping between network function and VNFs, a given VNF may support multiple network functions as well. For example a given VNF may support the AMF and SMF, or the SMF and UPF, or the SMF, AMF, UPF and PCF.

To illustrate by way of the example of FIG. 1B, when a request is received for a network function or service, the requesting NF may send the request to VNFs 310A-F instantiated on host computers 302-306. If a VNF has not been instantiated and/or additional VNFs are needed, a host computer may trigger instantiation of a VNF. To illustrate further, the VNF instances may be instantiated dynamically and/or asynchronously with individual requests (for example, based on the load level of VNFs). The instantiated VNF instance may then respond to the request. As used herein, the sender of a request (which in turn receives a response, for example) may be referred to as a consumer or consuming NF or VNF, while the receiver of the request (which produces a response or action) may be referred to as a producer or producing NF or VNF.

Each of the host computers 302-306 may include at least one processor circuitry and at least one memory circuitry including instructions such as program code which when executed by the processor circuitry causes operations associated with the host computer. The host computers may be coupled to a network, such as the Internet, a private network, an intranet, a core 3GPP network, and/or other nodes of a network, such as the 3GPP network. Moreover, each of the host computers may include virtual machines that emulate a physical computer (or aspects of a computer), and the virtual machines may host one or more VNF instances. The host computers may also include a hypervisor to operate these virtual machines. In operation, the system 199 may instantiate one or more VNF instances in a virtual machine. Furthermore, the host computers may include, or be coupled to, a dispatcher 195 for routing requests to certain VNF instances and/or triggering the instantiation of a new VNF instance. For example, a given VNF instance, such as VNF instance 310A, may be identified by an address. The address may include an address of the host computer 302, such as an IP address, a media access control address, and/or other type of address. Alternatively or additionally, the address may include an instance identifier (ID) indicating the specific instance for the VNF 310A, for example. The instance ID may identify the instance of VNF 310A from among other instances at the host computer 302.

In some example embodiments, some of the VNF instances may be grouped. When this is the case, a group ID may be used to refer to at least one VNF instance. When the VNFs are part of the same group, the VNF instances in that group may all have the same group ID. Moreover, the VNF instances in the group may all have access to a common persistent storage, such as a database, containing a UE's session information including the UE context information for a given UE session. In some example embodiments, the VNF instances in the group may all be similarly configured (for example, same or similar version of software, same or similar manufacturer, same or similar network function, same or similar slice, and/or the like). As such, any of the VNF instances in a group may be able to respond to a request given access to the UE's session information stored at the persistent storage. In some example embodiments, the group ID may be provided for a group of VNF instances, when each of the VNF instances in the group are stateless or semi-stateless.

Figure 2:
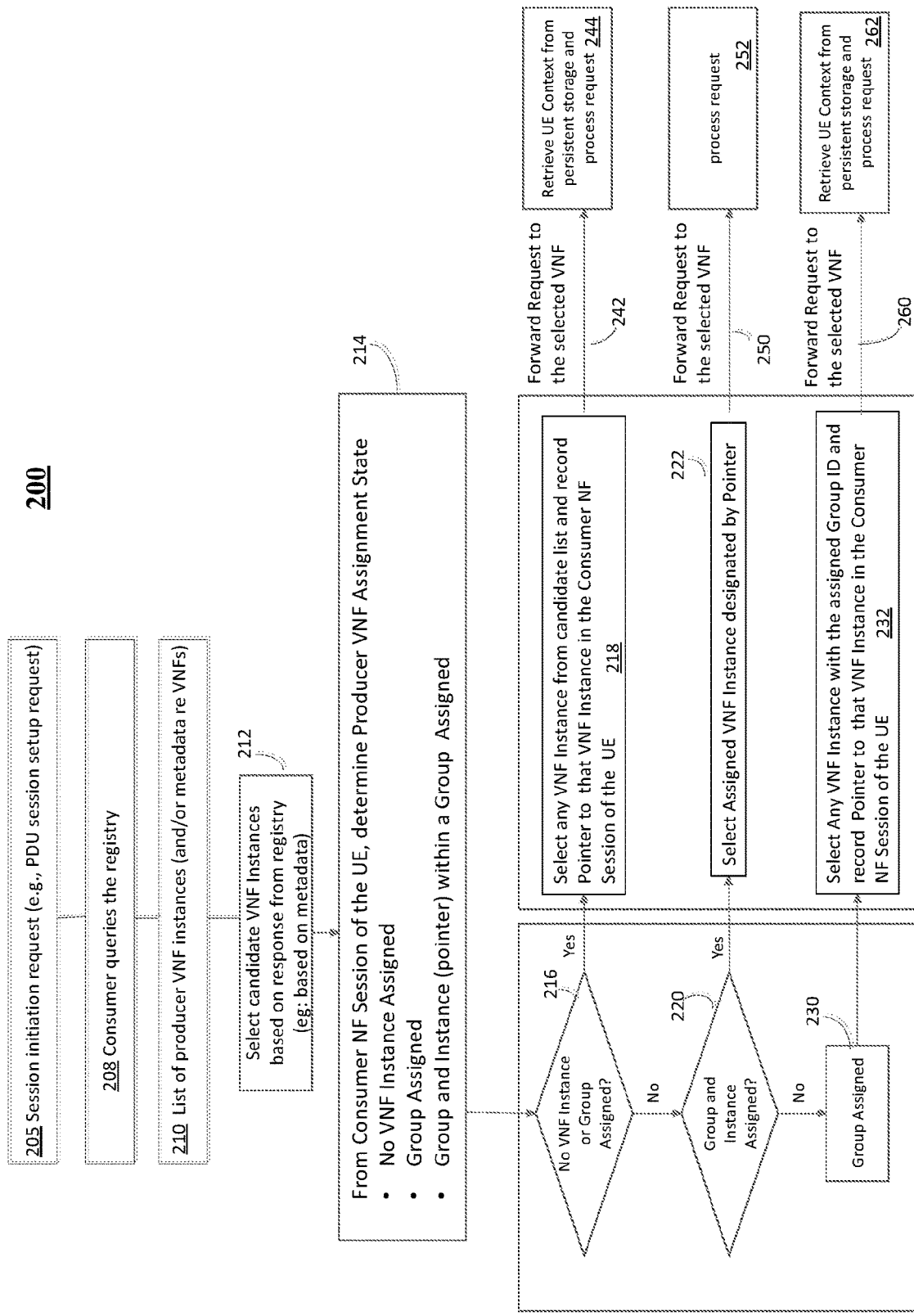
FIG. 2 depicts an example of a process for handling virtualized network functions, in accordance with some example embodiments.

FIG. 2 depicts an example process 200 for handling network functions, in accordance with some example embodiments. The description of FIG. 2 also refers to FIGS. 1A, 3 and 4.

At 205, a request may be received, in accordance with some example embodiments. For example, a consuming NF (which in the instant example is AMF 154 although other NFs may be used as well) may receive, from the UE 150, a request, which in this example is a session initiation request such as a packet data unit (PDU) session setup request. Although the instant example refers to the VNF being triggered by a session initiation setup request, the process 200 may operate with other types of requests and/or transactions as well.

At 208, a consuming NF, such as the AMF 154, may query a registry 166 to request a list of candidate producing VNF instances, in accordance with some example embodiments. For example, the AMF 154 may need a producing NF, such as a VNF instance configured to provide a SMF 156 type network function. When this is the case, the AMF 154 may send to the registry 166 a request for candidate VNF instances, and the request may include the type of function requested (which in this example is the SMF network function).

Although the example used with respect to FIG. 2 refers to a specific consuming NF, such as AMF 154, and a specific producing VNF providing an SMF network function 156, these are examples as other network functions may serve as consuming and/or producing NFs and/or may be virtualized as a VNF instance, in accordance with some example embodiments. Examples of the other types of NF nodes which can be virtualized as VNF instances include the PCF, the UDM, the authentication server function (AUSF), the network slice selection function (NSSF), the UPF, a network exposure function, and/or the like.

At 210, the consuming NF, such as the AMF 254, may receive a list of candidate producing VNF instances which may be able to provide the requested type of network function, in accordance with some example embodiments. In the example of FIG. 2, the registry 166 may return a list of candidate VNF instances configured to provide the SMF type network function. The response provided at 210 may also include, in accordance with some example embodiments, other information, such as metadata for the VNFs. In some example embodiments, the metadata may include the addresses of the VNFs, the type of VNF instance (for example, the NF type, such as SMF type), and/or the like. The metadata may also include at least one group ID identifying VNF groups and/or instance IDs identifying specific instances of VNFs.

Figure 3:
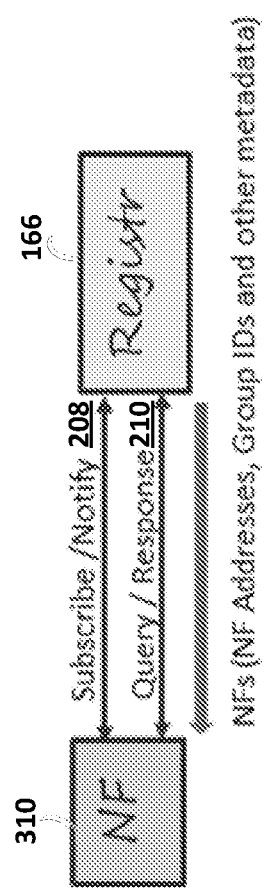
FIG. 3 depicts an example of a registry query for a candidate list of handling virtualized network functions, in accordance with some example embodiments.

FIG. 3 depicts an example interaction between the registry 166 and a consuming network function 310, in accordance with some example embodiments. The description of FIG. 3 also refers to FIG. 2.

In the example of FIG. 3, the consuming network function 310 (which in the current example is AMF 154 although other types of consuming NFs may be used as well) may interact with the registry 166, which may be a NRF though other registries may be used as well. The consuming network function 310 may query, at 208, the registry 166 to discover which producing VNF instance(s) offer a given type of service or functionality. Alternatively or additionally, the consuming network function 310 may subscribe to the registry 112 to receive updates, such as when a producing VNF of interest changes (for example, when a VNF instance fails, is added, is modified, is deleted, undergoes a type or configuration change, and/or the like). In the response at 210, the registry may, as noted, respond with the addresses of the VNF instances as well as other metadata. In some example embodiments, the metadata may include a group ID to indicate which VNF instances are part of the same group. When the VNFs are part of the same group, the VNF instances in that group may, as noted, have access to a common persistent storage, such as a database, containing a UE's session information including the UE context information for a given UE session. In some example embodiments, a group ID may be assigned, by a management plane function, to the stateless/semi-stateless groups of VNFs, and this assignment may be stored at the registry 166.

Referring again to FIG. 2, a consuming NF may select, at 212, at least one of the candidate VNF instances, in accordance with some example embodiments. The selection may be based on metadata obtained from the registry 166 as well as other information. To illustrate by way of an example, the consuming NF may base the selection on the type of network function provided by the VNF instance, the instance ID identifying a specific VNF instance, a group ID identifying a specific group of VNF instances, the NF capacity, the services supported by the NF, UE session information, whether the VNF instances are stateful, stateless, or semi-stateless, and/or other information. The group ID may identify (for example, point to) a group of VNF instances, and an instance ID may identify a specific VNF instance at a host computer.

To illustrate further, a consuming NF, such as the AMF 254, may take into account the assignment state of the UE session associated with the UE's request at 205. For example, if the there is no VNF instance assigned to the UE session (associated with the UE's request or transaction at 205), the AMF may be free to select any VNF instance. If however the session information indicates a group of VNF instances is assigned to the UE session associated with the UE's request/transaction at 205, the AMF may select any VNF instance in the group of VNF instances. And, if a specific VNF instance in a group of VNFs has been assigned to the UE session associated with the UE's request at 205, the AMF may assign that specific VNF instance from the group of VNFs.

At 214, the consuming NF, such as the AMF 254 in this example, may determine the assignment state for the UE session being handled, in accordance with some example embodiments. For example, the AMF may examine UE session information to see if a pointer (for example, an identity or address) is stored or assigned to the UE's session (as described further below with respect to FIG. 4 at 455). The UE session information may be cached locally at the AMF, obtained from a registry, shared data base, and/or other sources as well. The pointer may identify a VNF instance.

Figure 4:
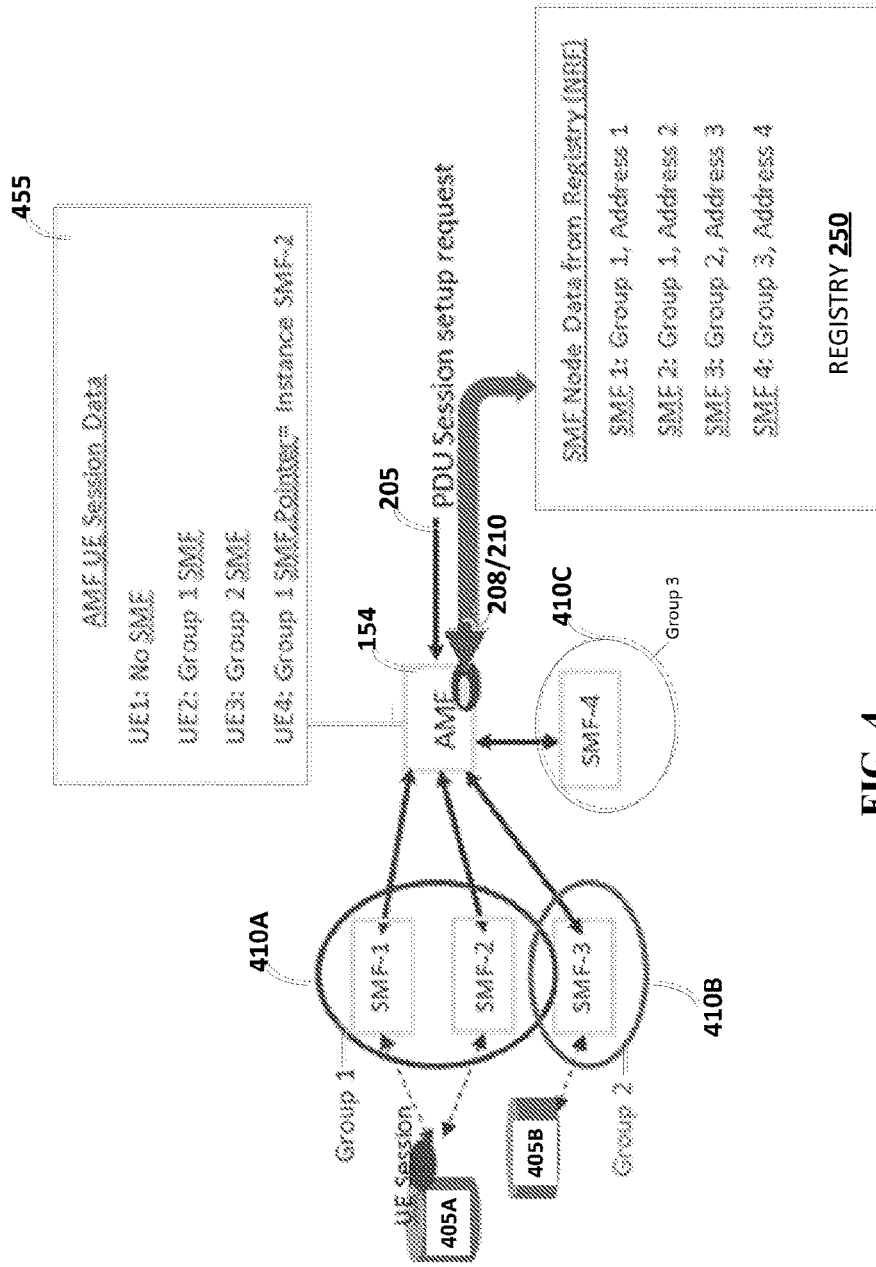
FIG. 4 depicts an example of a system including virtual network functions, in accordance with some example embodiments.

FIG. 4 depicts an example of VNF instances grouped 410A-C, in accordance with some example embodiments. In the example of FIG. 4, the VNF instances correspond to the SMFs 1-4, although as noted above other types of network functions, or combinations of network functions can be virtualized and grouped as well.

In the example of FIG. 4, when the consuming NF, such as AMF 154, receives the list of candidate VNF instances, such as SMF 1, SMF 2, SMF 3, and SMF 4. The AMF 154 may also receive, from the registry 166 (or from another node or locally cached), metadata for each of the VNF instances. In the example of FIG. 4, the SMFs 1-2 are part of group 1 410A as shown by the common group ID "1", SMF 3 is part of group 2 410B as shown by the common group ID "2", and SMF 4 is part of group 3 410C as shown by the common group ID "3". The metadata also includes an address, or pointer, for each VNF instance. For example, SMF 1 may have an address comprising (1) an IP address identifying the host computer hosting the VNF instance comprising SMF 1 and/or (2) an instance identifier, indicating at the host computer, the VNF instance comprising SMF 1.

The registry information 250 shows that the SMF 1 and SMF 2 are both in group 1, so SMF 1 and SMF 2 can be used interchangeably as SMF 1 and SMF 2 may be stateless or semi-stateless VNFs. However, the SMF 3 and the SMF 4 may be of any type (for example, stateful, stateless, or semi-stateless). As SMF 3 and the SMF 4 have their own unique group IDs, a session may be bound to SMF 3 or SMF 4, when established.

The VNFs in the same group may, as noted, have access to a common persistent store in order to obtain session information. For example, group 1 410A including SMFs 1 and 2 have access to database 405A which stores session information including UE context information for a UE session, while group 2 410B including SMF 3 has access to database 405B.

At FIG. 4, the AMF 154 may select an SMF VNF instance for each UE 1-4 with the indicated session information at 455. In the case of UE 1 (which has no assigned SMF VNF instance), the AMF may pick any SMF VNF instance as the AMF is handling a new session for UE 1. Regarding UE 2, it has had a session previously handled by the group 1 SMF VNF instances. As the session information 455 for UE 2 does not include a pointer to a specific instance ID in group 1, the AMF may select any SMF VNF instance within group 1 (for example, SMF 1 or SMF 2) for further interaction involving UE 2's session. When the SMF VNF instance receives a message from the AMF, the SMF VNF instance will retrieve the SMF session information for UE 2 from the common persistent storage, such as database 405A. Regarding UE 3, UE 3 has had a session previously handled by the group 2 SMF VNF instance. In the example of FIG. 4, SMF 3 is the only group 2 SMF VNF instance, so this SMF VNF instance must be selected by the AMF. Regarding UE 4, the session information identifies group 2 and a pointer identifying SMF 2 VNF instance. In this example, the AMF must send all messages associated with the transaction to SMF 2 VNF instance. When the transaction or period of UE 4 activity ends, the SMF 2 VNF instance may release the UE session information to the persistent storage 405A, and notify AMF that UE 4 session information should be updated to remove the pointer to SMF 2 VNF instance.

Referring again to FIG. 2, the consuming NF such as AMF 154 may, at 214, need to take into account the assignment state as indicated by the UE's session information (for example, session information 455) associated with the UE.

If there is no VNF instance or VNF group assigned to the UE's session as indicated by the UE's session information, any VNF instance may be selected from the candidate list (yes at 216 and 218). Moreover, a pointer identifying the identity or location of the selected VNF instance (and/or group) may be recorded, at the consuming NF, for the UE session being handled. For example, the AMF 254 may add the pointer to the UE request before forwarding the request, store the pointer locally at the AMF as session information, and/or store the pointer at a registry. The pointer may be any type of identifier of location or identity. For example, the pointer may comprise an IP address, fully qualified domain name, MAC address, and/or other indication of the identity or location of a group ID and/or VNF instance.

If there is a VNF instance and VNF group assigned to a UE session as indicated by the UE's session information, the assigned VNF instance (which may be designated in a pointer in UE session information) may be selected (yes at 220 and 222).

If only a VNF group is assigned to a UE session as indicated by the UE's session information, any VNF instance from the VNF group assigned to the UE session may be selected (230 and 232). For example, any VNF instance in the VNF group indicated by the VNF group ID may be selected. Moreover, a pointer to the selected VNF instance may be recorded for the UE session being handled.

Referring again to 218, the consuming NF may then forward, at 242, the UE session request to the VNF instance selected at 218, in accordance with some example embodiments. For example, AMF 254 may forward a session initiation request 205 to the selected VNF instance. At 244, the selected VNF instance may (if needed) then retrieve, from persistent storage, UE session information (e.g., content information) and then proceed to process the UE request 205.

Referring again to 222, the consuming NF may then forward, at 250, the UE session request to the VNF instance selected at 222, in accordance with some example embodiments. For example, the AMF 254 may forward a session initiation request 205 to the VNF instance selected at 222. This selected VNF instance may then process, at 252, the UE request 205. If the selected VNF has been previously assigned, the selected VNF may not need, at 252, to access persistent storage for UE context information as the selected VNF may already have the session or context information to handle the UE's request. If the UE context information is needed at 252, the select VNF may access that information from persistent storage as noted at 244, for example.

Referring again to 232, the consuming NF may then forward, at 260, the UE session request to the VNF instance selected at 232, in accordance with some example embodiments. At 262, the selected VNF instance may then retrieve, from persistent storage, UE content information and then proceed to process the UE session request.

In accordance with some example embodiments, the consuming NF such as AMF 154 may release the pointer to the VNF, when there is a change or failure in the handling the UE session.

Referring again to 212, initially (for example, prior to the first selection of a producer VNF instance by the consuming NF), the pointer in the UE session information may not be known or populated in the UE's session information or a message, for example. When this is the case, the consuming NF may pick any producing VNF instance within a corresponding VNF group. The address for the picked producing VNF instance may then be used as the pointer that is used to populate a transaction or request message, and the pointer may be maintained for the transaction(s) with the producing VNF instance. If later the selected producing VNF instance wants to allow the consuming NF to pick a different producing VNF instance, the producing VNF instance may indicate to the consuming NF to release the pointer. At this point, the prior/old producing VNF instance (requesting the release) may then store its UE session information in persistent storage, such as database 405A or other type of data storage function accessible by the VNFs in the old producing VNF's group. If the consuming NF detects that a producing VNF has failed, the consuming NF may autonomously release the pointer. This allows a new VNF instance from the producing VNF's group to be selected for the next transaction. The producing VNF may release the pointer for a specific UE only, release the pointer for all UEs, and/or release the pointer for sessions served by the producing VNF.

As noted, the VNF instances may be configured to provide other types of network functions. In the case of a PCF for example, the VNF instances in the same group may be able to access the same database including UE Policy and Charging Control Sessions. In the case of a network function comprising user data management (UDM, see, for example, 3GPP TS 23.501), the VNF instances comprising UDM front-ends in the same group may be able to access the same user data repository/shared data layer where subscriber data is stored. In the case of the SMF, the VNF instances in the same group may be able to control sessions on the same UPFs. In the case of the AMF, the VNF instances in the same group may have connectivity to the same RAN and/or AN nodes.

In some example embodiments, the producing VNF instance (which in the instant example is a stateless VNF instance, such as the SMF instance) may store session information, such as the UE context, in persistent storage at the end of a transaction. For subsequent transactions, the AMF (which serves as the consuming NF in this example) may use the previously selected producer NF (for example, a serving NF) instance as indicated by a pointer stored in the session information/UE context of the AMF.

In some example embodiments, the producing VNF instance (which in this example is a semi-stateless VNF instance, such as an SMF instance) may store the session information, such as the UE context, in persistent storage at the end of a given period of UE activity (which may be determined based on local policies of the producer NF). And, the SMF instance may inform consuming NFs that the consuming NF may pick a new VNF, when the UE's activity resumes. The SMF instance in this example may inform the consumer NF to remove the association between the UE context and the producer NF instance pointer. At the beginning of a new activity period, a consuming NF may select any NF from the group of NF instances identified by a NF group ID (for example, SMF Group ID). During periods of activity, the consuming NF may pick the currently selected producer NF as indicated by the pointer in its own context.

In some example embodiments, the producing VNF instance (which in this example is a semi-stateless, dedicated VNF instance such as an SMF instance) may store the UE context in persistent store at the end of a period of UE activity (determined based on local policies of the producer NF, for example). The consuming NF may pick the currently selected producer NF as indicated by a pointer in its own context.

In some example embodiments, the producing VNF instance (which in this example is a stateful VNF instance such as an SMF instance) may store the UE session information or context locally. For subsequent transactions, the consuming NF uses the previously known producing VNF (which is serving the consuming NF) pointer to select the NF and forward the request.

From the consuming NF perspective such as the AMF 154, the consuming NF may know whether a pointer to a producing VNF instance has been populated with a valid address, such as the instance identifier. When the pointer is populated, the consuming NF is interacting directly with the producing VNF instance at the specified address. When a pointer is not populated but the group is populated, the consuming NF may select, as noted, any VNF instance from the group and populate the pointer with the corresponding address of the VNF instance. Similarly, the registry 166 may not know explicitly the type of NF (stateless, semi-stateless, and/or stateful). An identifier, such as a unique ID or special group ID, may indicate that a substitute producing VNF instance cannot be chosen once the producing VNF instance has been selected.

In some example embodiments, the consuming NF may store both the VNF group ID and a pointer to the VNF (if populated) as part of the UE session information such as the UE context data. If the producing VNF is stateless, or semi-stateless with an idle UE, then the pointer may not be assigned to a specific VNF instance, so consuming NF can select any VNF from the VNF group. But if the producing VNF is holding a UE state, then the VNF pointer will be populated with the specific VNF instance address.

In some example embodiments, a producing VNF instance that is stateless may request the consuming NF to remove the pointer at the end of each transaction. For example, the producing VNF instance, such as the SMF instance of FIG. 4, may send a message to the consuming NF, such as the AMF, to remove the pointer from the UE context, so that the consuming NF can remove the corresponding pointer to the producing VNF instance.

In some example embodiments, the registry 166 may be configured with an indication to not keep a pointer towards the producing VNF instance, when a transaction has been completed. When the consuming NF query's the registry for example, the metadata (which is returned to the consuming VNF) may include this indication to not keep the pointer after a transaction for certain stateless VNFs.

If demand for a service or network function increases, additional producing VNFs may be instantiated by a management plane. The additional VNFs may be registered with the registry 166, which in turn may send push notifications to inform consuming NFs that a new producer from a VNF group of interest is available. On the other hand, if demand for service wanes, producing VNFs may be removed from service by simply blocking new transactions. For example, the registry may remove a producing VNF from the registry, so that the producing VNF can no longer be discovered by consuming NFs. If a consuming NF has already discovered the removed producing VNF, the registry may push a message to the consuming NF regarding the removal. As ongoing transactions end or UEs become idle, the session information/UE context data in the producing VNF may be returned to a shared persistent storage. Since no new transactions are started, the producing VNF can quickly become idle, after which it can be deactivated and removed from service.

Although a fully stateless VNF may eliminate the need for a Diameter routing agent or similar function to associate VNFs with UE contexts, semi-stateless VNFs may need this Diameter routing agent or similar function. For example, when a UE becomes active and an ongoing consumer-producer interaction has been initiated (for example, between the AMF and SMF), a new consuming NF may want to find the same producing VNF instance that currently has the UE context. For new transactions to semi-stateless VNFs, the producer indicated by the VNF pointer may need to be validated. If a pointer to another VNF instance in the same group already exists, the transaction may be redirected/forwarded to the relevant service producer VNF instance and the consuming NF told to replace the selected pointer with the current pointer to the relevant service producing VNF instance).

Figure 5:
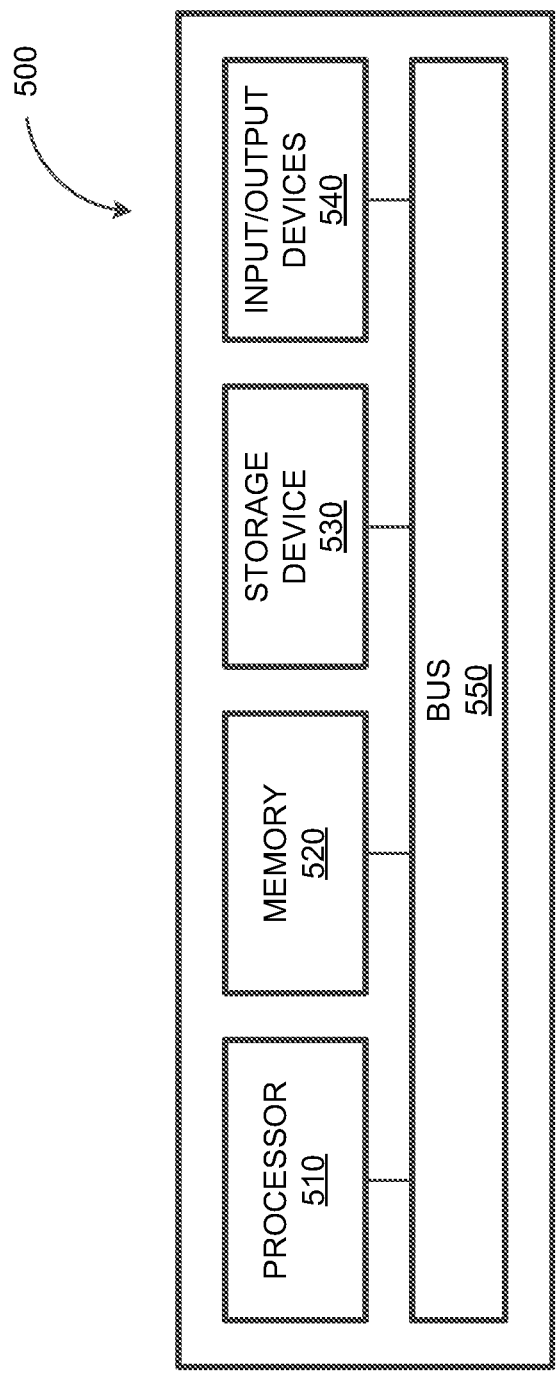
FIG. 5 depicts an example of an apparatus, in accordance with some example embodiments.

FIG. 5 depicts a block diagram illustrating a computing system 500, in accordance with some example embodiments. The computing system 500 may be used to implement the host computers 302, 304, 306 and the like at FIG. 5. Alternatively or additionally, the computing system may be used to provide the virtualized network functions (VNFs), in accordance with some example embodiments.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 may be capable of processing instructions for execution within the computing system 500. Such executed instructions can implement host computers 302, 304, 306 a network node including a home subscriber server, a serving call session controller function, a serving call session controller function instance, and/or other types of nodes, NFs, and/or VNFs. In some example embodiments, the processor 510 may host one or more virtual machines, each of which may include a network node, such as a serving call session control function instance as well as other types of nodes, NFs, and/or VNFs. The processor 510 may be capable of processing instructions stored in the memory 520 and/or on the storage device 530 to display graphical information for a user interface provided via the input/output device 540.

The memory 520 may be a computer readable medium such as volatile or non-volatile that stores information within the computing system 500. The memory 520 can store instructions, such as computer program code. The storage device 530 may be capable of providing persistent storage for the computing system 500. The storage device 530 can be a hard disk device, an optical disk device, or a tape device, or other suitable persistent storage mechanism. The input/output device 540 provides input/output operations for the computing system 500. In some example embodiments, the input/output device 540 includes a keyboard and/or pointing device. In various implementations, the input/output device 540 includes a display unit for displaying graphical user interfaces. Alternatively or additionally, the input/output device 540 may include wireless and/or wired interface to enable communication with other devices, such as other network nodes. For example, the input/output device 540 can include an Ethernet interface, a WiFi interface, a cellular interface, and/or other wired and/or wireless interface to allow communications with one or more wired and/or wireless networks and/or devices.

Figure 6:
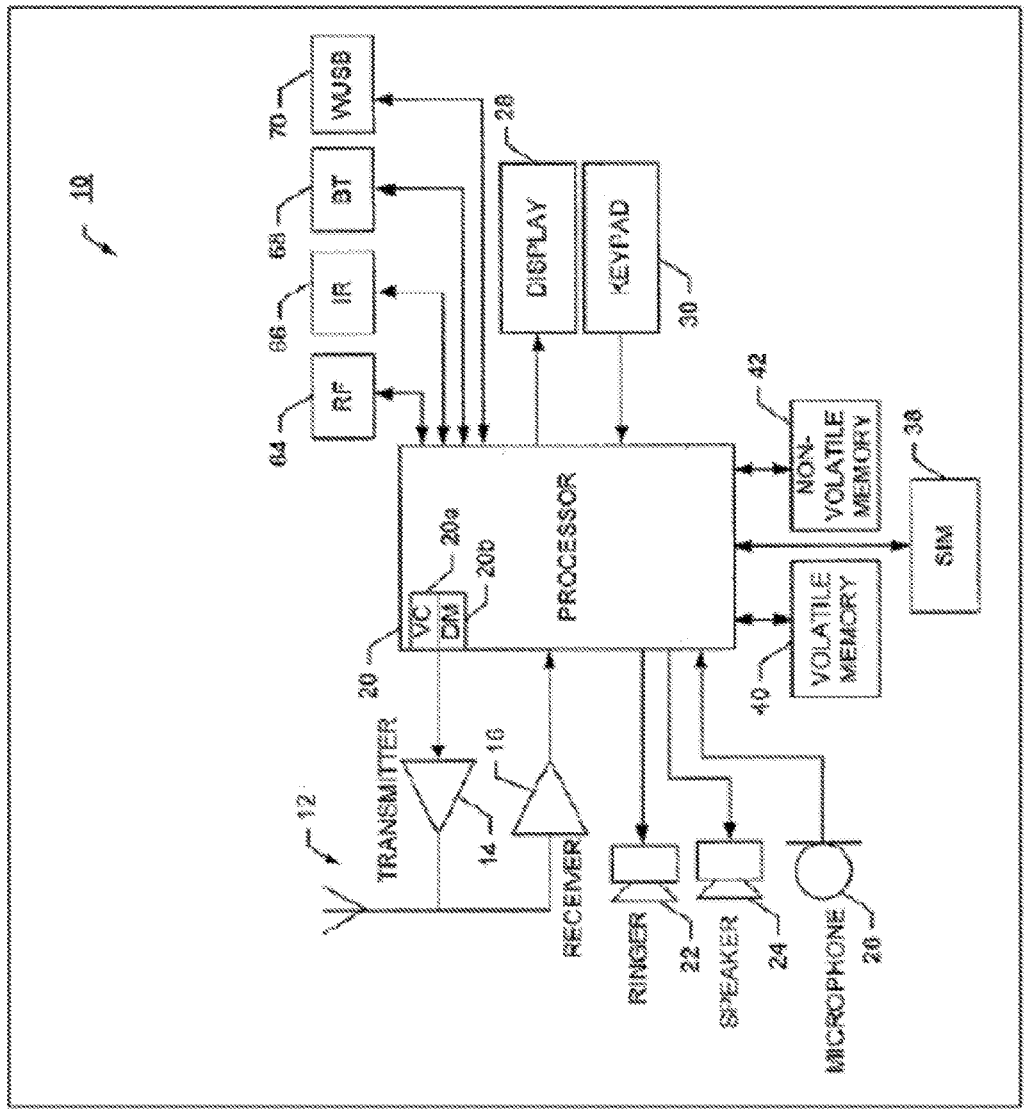
FIG. 6 depicts another example of an apparatus, in accordance with some example embodiments.

FIG. 6 illustrates a block diagram of an apparatus 10, in accordance with some example embodiments.

The apparatus 10 may represent a user equipment, such as the user equipment 110. For example, the apparatus 10 may be configured as user equipment 150. Alternatively or additionally, one or more portions of the apparatus 10 may be used to implement a network node, such as a base station, a core network node, and/or other types of nodes, NFs, and/or VNFs.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, process 200 and/or the like.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, for example, process 200 and/or other operations/functions disclosed herein).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced flexibility in instantiating network functions in a network.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   selecting, by a network node, a group of network function instances, the network node directly selecting the group of network function instances of a same type of network function instances, the selecting based on information indicating membership of a network function instance in the group of network functions instances and the information further including session information for a request associated with a session of a user equipment, the session information indicating the network function instance and the group of network function instances were assigned to the user equipment for a previous session; and
   forwarding, by the network node, the request to at least one network function instance within the group of network function instances.

2. The method of claim 1 further comprising:
   receiving, by the network node, the request, wherein the group of network function instances are a same type of virtualized network function.

3. The method of claim 1, wherein the information indicating membership comprises group identifier.

4. The method of claim 1, further comprising:
   receiving, by the network node, the information including a group identifier identifying the group and a pointer identifying the network function instance, the session information indicating the group identifier and the pointer were previously being assigned to serve requests for the user equipment.

5. The method of claim 1, further comprising:
   receiving, by the network node, candidate information including at least one candidate network function instance, wherein the candidate information indicates the membership of the network function instance in the group and/or address information of the candidate network function instance.

6. The method of claim 5, wherein the selecting further comprises:
   in response to the information indicating the session is assigned to the group identifier and the pointer, forwarding, by the network node, the request to the network function instance indicated by the group identifier and the pointer, wherein the network function instance is within the group indicated by the group identifier.

7. The method of claim 5, wherein the selecting further comprises:
   in response to the information indicating the session is assigned to the group identifier without the pointer being assigned, forwarding, by the network node, the request to the network function instance selected from within the group indicated by the group identifier.

8. The method of claim 5, wherein the selecting further comprises:
   in response to the information indicating the session has not been assigned to the group or the pointer, selecting, based on the candidate information, a candidate network function instance in a corresponding group of network function instances, wherein the candidate network function instance comprises the selected network function instance.

9. The method of claim 8, further comprising:
   storing, as part of the session information, the pointer to the selected network function instance and/or the group identifier to the selected group.

10. The method of claim 1, further comprising:
    receiving, by the network node, a release indication indicating the session is not bound to the network function instance; and
    releasing, by the network node, the pointer to the network function instance.

11. The method of claim 1, wherein the network function instance is configured to provide at least an access management function, a session management function, a policy control function, a user plane function, a user data management function, an authentication server function, a network exposure function, and/or a network slice selection function.

12. The method of claim 1, wherein the network function instance comprises a virtualized network function instance, and wherein the group comprises virtualized network function instances.

13. The method of claim 12, wherein the virtualized network function instance is virtualized in a host computer and/or a virtual machine.

14. An apparatus comprising:
    at least one processor; and
    at least one memory including computer program code, the at least one memory and the computer program code configured to, with the at least one processor, cause the apparatus to at least:
    select a group of network function instances, the apparatus directly selecting the group of network function instances of a same type of network function instances, the selection based on information indicating membership of a network function instance in the group of network functions instances and the information further including session information for a request associated with a session of a user equipment, the session information indicating the network function instance and the group of network function instances were assigned to the user equipment for a previous session; and
    forward the request to at least one network function instance within the group of network function instances.

15. The apparatus of claim 14, wherein the apparatus is further caused to at least receive the request, wherein the group of network function instances are a same type of virtualized network function.

16. The apparatus of claim 14, wherein the information indicating membership comprises a group identifier.

17. The apparatus of claim 14, wherein the apparatus is further caused to at least:
    receive the information, the information including a group identifier identifying the group and a pointer identifying the network function instance, the session information indicating the group identifier and the pointer previously being assigned to serve requests for the user equipment.

18. The apparatus of claim 14, wherein the apparatus is further caused to at least:
    receive candidate information including at least one candidate network function instance, wherein the candidate information indicates the membership of the network function instance in the group and/or address information of the candidate network function instance.

19. The apparatus of claim 18, wherein the apparatus is further caused to at least:
in response to the information indicating the session is assigned to the group identifier and the pointer, forward the request to the network function instance indicated by the group identifier and the pointer, wherein the network function instance is within the group indicated by the group identifier.

20. A non-transitory computer-readable storage medium including program code which when executed by at least one processor causes operations comprising:
selecting, by a network node, a group of network function instances, the network node directly selecting the group of network function instances of a same type of network function instances, the selecting based on information indicating membership of a network function instance in the group of network functions instances and the information further including session information for a request associated with a session of a user equipment, the session information indicating the network function instance and the group of network function instances were assigned to the user equipment for a previous session; and
forwarding, by the network node, the request to at least one network function instance within the group of network function instances.

* * * * *